United States Patent [19]

Delonnay

[11] 3,987,751

[45] Oct. 26, 1976

[54] APPARATUS FOR COATING CONFECTIONERY SUCH AS CHOCOLATES OR BISCUITS

[76] Inventor: Jean H. Delonnay, La petite Anesse, 45500 Gien, France

[22] Filed: Jan. 24, 1975

[21] Appl. No.: 544,013

[30] Foreign Application Priority Data

Jan. 31, 1974 France .............................. 74.03202
Dec. 16, 1974 France .............................. 74.41345

[52] U.S. Cl. ............................ 118/24; 118/DIG. 4; 118/324; 198/472
[51] Int. Cl.² .......................................... B05C 5/00
[58] Field of Search ................. 118/324, DIG. 4, 13, 118/18, 24; 427/420; 198/154, 158, 29

[56] References Cited

UNITED STATES PATENTS

| | | | |
|---|---|---|---|
| 1,672,522 | 6/1928 | Greer et al. ......................... | 198/158 |
| 1,732,228 | 10/1929 | Greer et al. ........................... | 198/29 |
| 1,807,338 | 5/1931 | Greer .................................... | 198/29 |
| 2,597,271 | 5/1952 | Williams .............................. | 198/158 |
| 2,704,519 | 3/1955 | Guggenheim ......................... | 198/29 |
| 3,232,247 | 2/1966 | Vaughan .............................. | 198/158 |

*Primary Examiner*—Dorsey Newton
*Attorney, Agent, or Firm*—Oblon, Fisher, Spivak, McClelland & Maier

[57] ABSTRACT

Apparatus for coating confectioneries such as chocolates or biscuits, including a feed device for receiving the confectionery to be coated and feeding the confectionery to a coating device wherein the confectionery is coated, means for driving the feed device and the coating device in synchronism, and means disposed immediately downstream of the coating device for receiving and discharging the coated confectionery and including a removable belt and drive means for advancing the belt over a guide plate fitted adjacent the coating device and thence over a removable support plate whereby confectionery coated in the coating device is received on the advancing belt, the guide plate having a normal working position and being disposable away from the coating device out of working position, and including control means for temporarily displacing the guide plate away from the coating device during the passage of the leading end of the belt into the gap between the leading edge of the guide plate and the coating device.

2 Claims, 13 Drawing Figures

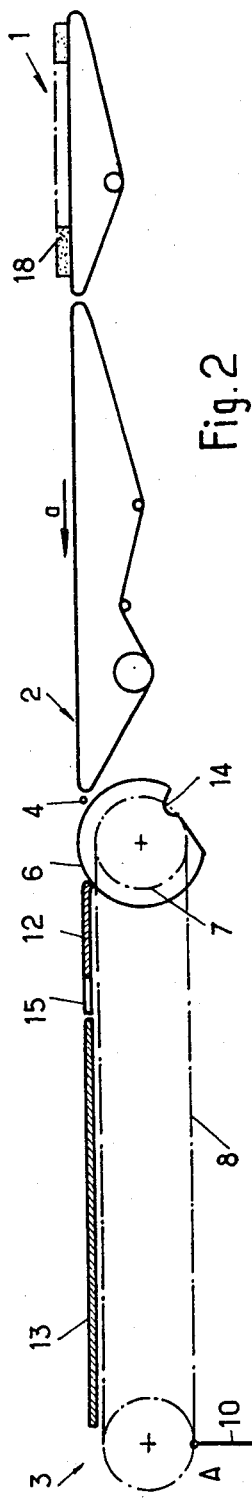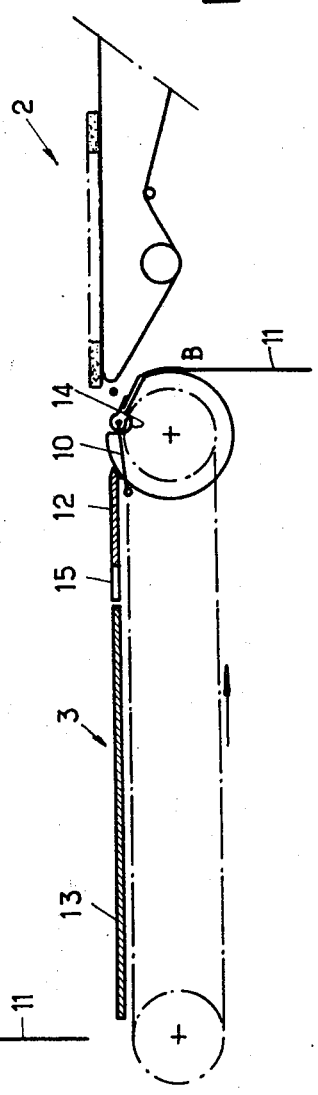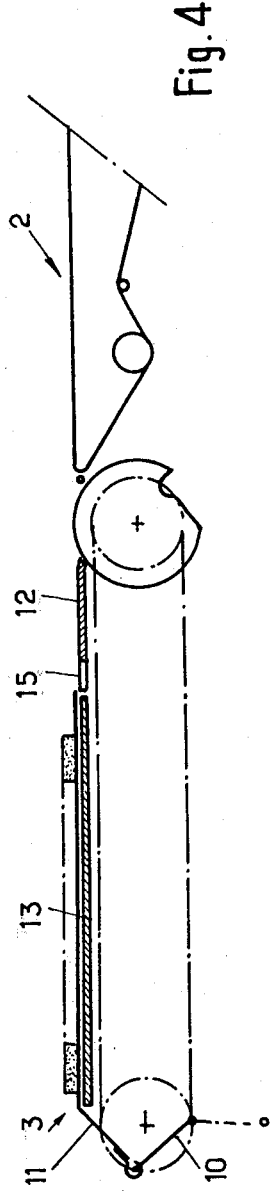

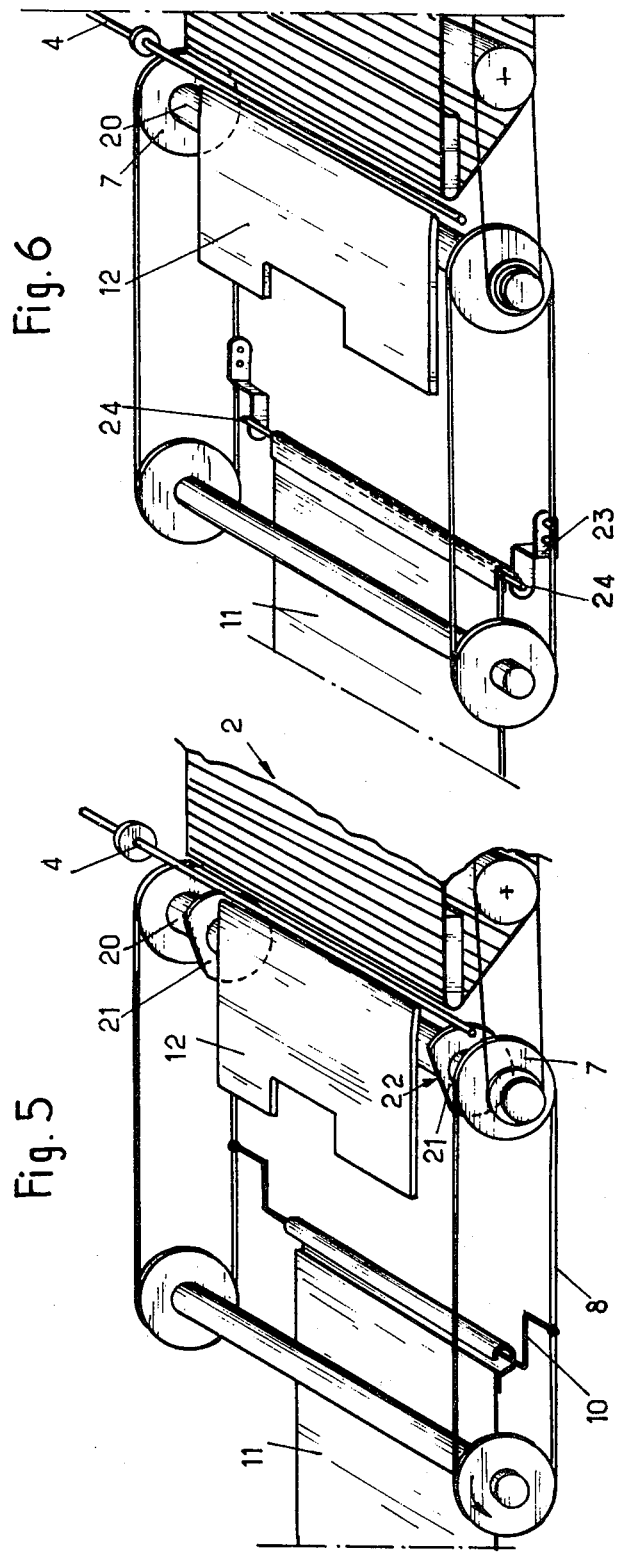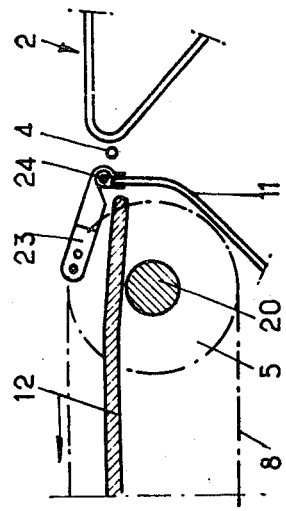

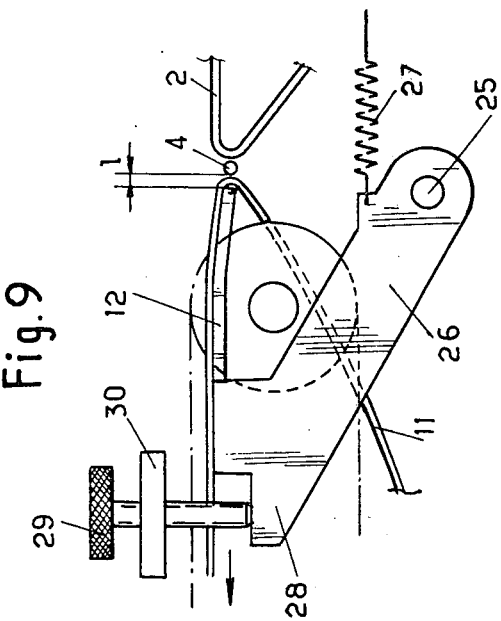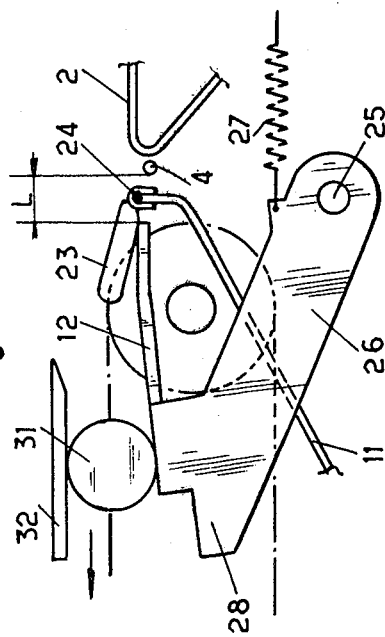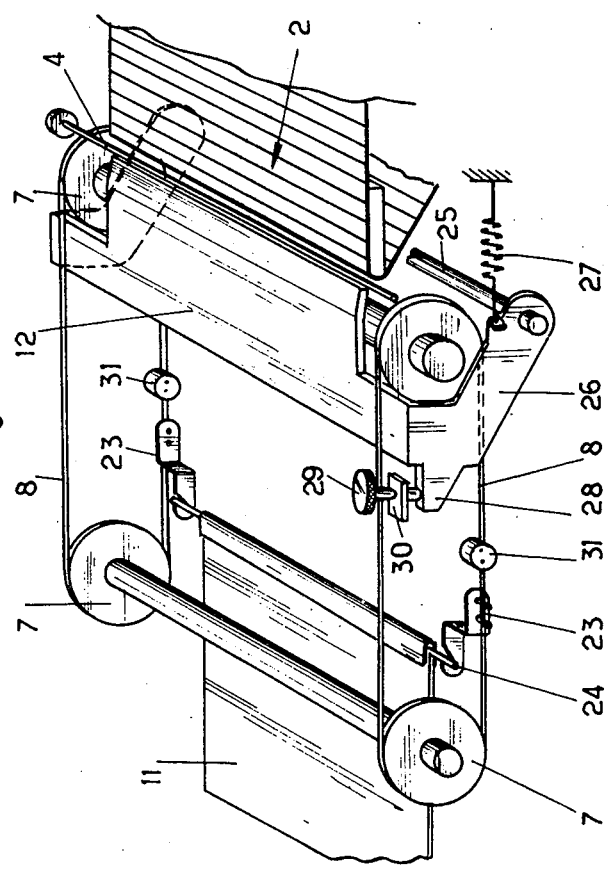

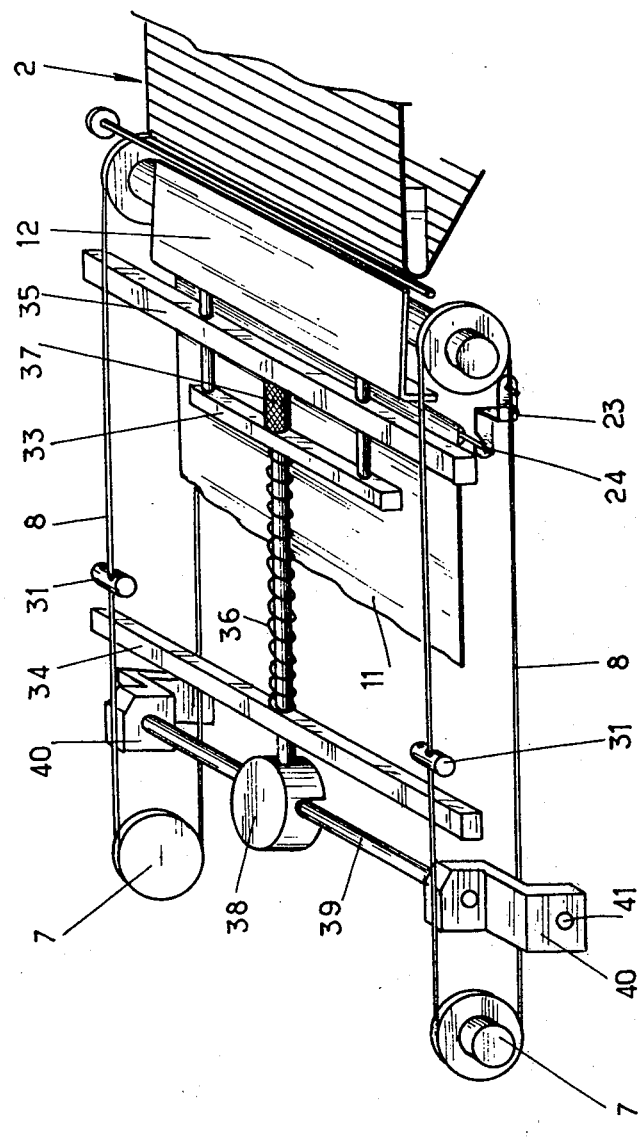

APPARATUS FOR COATING CONFECTIONERY SUCH AS CHOCOLATES OR BISCUITS

The present invention relates to an apparatus for coating confectionery such as chocolates or biscuits and comprising a feed device for receiving the confectionery to be coated, a coating device and a device for discharging the chocolate-coated confectionery, said feed, coating and discharge devices being driven in synchronism.

Coated chocolates or biscuits consist mainly of two parts, namely an inner or sweet part and an outer or coated part. The inner part is based on praline, almond paste, fondant etc. in the case of chocolates, and on pastry in the case of biscuits, whereas the outer part is generally constituted by a layer of chocolate or the like.

At present such confectionery is coated by means of complex and very elaborate machines which are commonly known as enrobers and which function in the following manner: the inner parts are placed on the feed device which aligns them and carries them towards the coating device which continuously passes these inner parts over a wave or below a curtain of chocolate held at the required temperature which completely coats these inner parts. The coated products then pass, still continuously, from the coating device to a conveyor belt which carries them into a cooling tunnel or on to a cooling belt.

These machines thus operate on a continuous basis and this calls for the presence of at least two or three people. Furthermore, these machines are clearly very costly and in addition they occupy considerable space so that they cannot be used in small workshops.

The object of the present invention is to overcome these drawbacks and to provide an apparatus which occupies little space and which can be operated by only one person, coating of the confectionery proceeding in cycles.

To achieve this object, an apparatus for coating confectionery in accordance with the invention is characterized in that the discharge device comprises a member for supporting the confectionery disposed immediately downstream of the coating device, a guide plate and a removable pick-up plate which are fitted downstream of the supporting member in the plane of travel of the confectionery, drive means being provided for advancing a removable depositing belt over the support member and the two plates.

It will be readily appreciated that with the aid of this arrangement the entire length necessary for fitting the cooling tunnel or cooling belt is no longer required, the chocolate-coated articles being received on the depositing belt of the discharge device and, consequently, above the pick-up plate, and this enables the workman operating the apparatus to take away this removable pick-up plate and the depositing belt together with the coated articles and to pass them into a cooling means.

In one particular embodiment of the invention, the means for driving the depositing belt are constituted by two lateral endless chains to which said belt is removably attached by one of its ends.

The support member preferably incorporates a gap adapted to receive said end of the depositing belt.

Thus the end of the belt and its attachment means can be retracted into the support member at the moment when they pass over this member, so that the belt can be brought very close to the coating device. It is in fact essential that the gap between the coating device and the discharge device be as small as possible so as to avoid damage to the articles that have just been coated with chocolate.

This gap however is largely determined by the position of the guide plate intended to support the depositing belt during its travel. It will be clear that if this plate is fixed, it is necessary to provide a minimum gap between it and the coating device in order to enable the depositing belt to pass through in a reliable manner, and in particular to permit free passage of that of its ends whereby it is attached to the corresponding drive means.

For this reason and in accordance with a further important feature of the invention, the apparatus comprises control means for temporarily moving the displaceable guide plate away from the coating device during passage of the leading end of the depositing belt.

It will be readily appreciated that with such an arrangement the depositing belt is enabled to pass through in a very reliable manner, and at the same time the working gap between the guide plate and the coating device can be reduced to a minimum, in which gap the tailing device for trimming the end of the coated article is generally fitted immediately in front of said coating device.

In a first embodiment, the guide plate is mounted to pivot about a fixed axis with the aid of side-plates.

In a further embodiment, the guide plate is secured to a slide adapted to move longitudinally in a fixed frame.

The control means are preferably constituted by a cam which is provided on the means for driving the depositing belt and which co-operate with a surface mechanically connected to the guide plate.

Thus, perfect synchronization between the movement for retracting the guide plate and the passage of the leading end of the depositing belt is achieved in a very simple manner.

Furthermore, a return spring is advantageously provided for automatically bringing the guide plate into the working position after the leading end of the depositing belt has passed through the gap, this working position being determined by an adjustable stop.

Thus, with the aid of this adjustable stop, it is possible to adjust with very great precision the minimum distance between the guide plate and the tailing device as a function of the type of product to be coated.

Some embodiments of the invention will now be described by way of example and with reference to the annexed drawings in which:

FIGS. 2 to 4 are diagrammatic views of the apparatus of the invention, showing different stages in the operation of the apparatus;

FIGS. 5 and 6 illustrate two modified forms of the apparatus of the present invention;

FIG. 7 is a view of a detail from FIG. 6;

FIG. 8 is a perspective view of part of an apparatus in accordance with the invention, equipped with a movable guide plate;

FIGS. 9 and 10 are diagrammatic views illustrating the mode of operation of this apparatus;

FIG. 11 is a perspective view of part of a modified form of the mobile guide plate.

Figure 1:
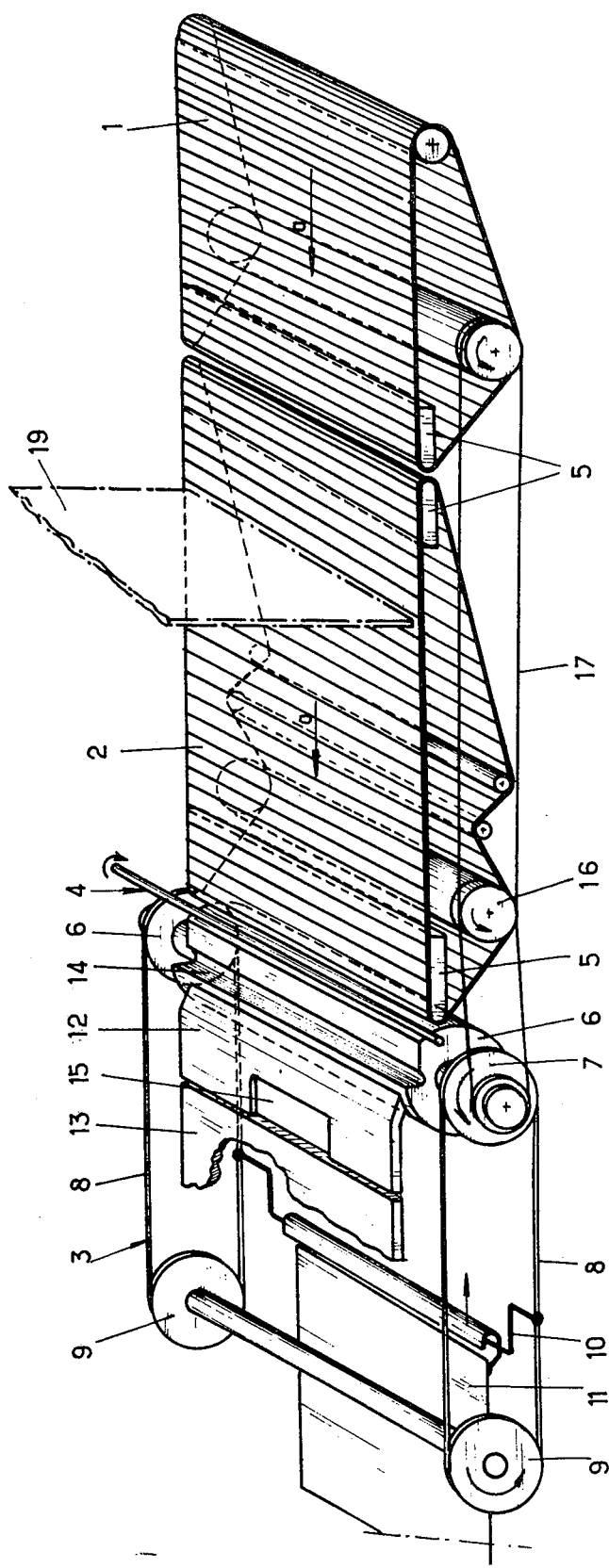
FIG. 1 is a perspective view of an apparatus in accordance with the invention.

The apparatus for coating confectionery illustrated in FIG. 1 comprises, on a stand not illustrated, a feed device 1 which receives the confectionery to be coated, a coating device 2 and a discharge device 3 which enables the chocolate-coated confectionery to be moved towards a cooling means, not illustrated. The apparatus also comprises a tailing device 4 for smoothing the layer of chocolate.

The feed device 1 and the coating device 2 are constituted by conventional endless grids which move in the direction indicated by the arrow a, the grids bearing on arms 5 to ensure a minimum gap between the two devices.

In accordance with the present invention, the discharge device 3 comprises a support member which is constituted in the present case by a roll 6 with sprockets 7 integral therewith. Drive chains 8 move round the sprockets 7 and two other sprockets 9. A depositing belt 11 is removably mounted on a stirrup 10 integral with the chains 8. Immediately downstream of the support roll 6 in the plane of travel of the confectionery is mounted a guide plate 12 integral with the stand, this being followed by a removable pick-up plate 13 fitted and centered on fixed supports, not illustrated, which are likewise integral with the stand.

Formed in the support roll 6 is a notch 14, the purpose of which will be explained more clearly hereinafter.

A recess 15 is formed in the guide plate 12 to enable the removable pick-up plate 13 to be gripped more easily.

The feed device 1, the coating device 2 and the drive chains 5 are moved in synchronism with the aid of sprockets 16 and chains 17.

The apparatus so formed operates in the following manner: at the beginning of the cycle, the inner parts 18 to be coated are placed on the feed grid, and the depositing belt 11 is in the position A as shown in FIG. 2. The feed grid carries the inner parts to be coated towards the coating device 2 which passes these parts through a curtain 19 of chocolate which is held at the required temperature and completely enrobes the articles.

Immediately after this operation, the chocolate-coated articles move to a position above the tailing device 4. The depositing belt 11 is then in the position B as illustrated in FIG. 3. The stirrup 10 and the end of the depositing belt 11 previously attached to this stirrup disappear into the notch 14 in the support roll 6, and this enables a very small gap to be formed between the coating device 2 and the support roll 6 so as to enable the chocolate-coated articles to pass readily from the coating grid to the depositing belt 11 without the risk of any damage to the fresh layer of chocolate which forms the coating. The depositing belt 11 then passes above the guide plate 12 after which it moves onto the removable pick-up plate 13 as shown in FIG. 4. At the end of the cycle, the workman operating the apparatus detaches the depositing belt 11, carrying the treated confectionery, from the stirrup 10 and lifts up the belt and the removable pick-up plate 13 which can be gripped because of the presence of the recess 15 formed in the guide plate 12. All that then remains to be done is to place the plate with the articles of confectionery on it in a refrigerating means where a temperature of approximately 12° C is maintained, in order to solidify the coating and fix it in its final position. To start the operation again, it is only necessary to fit another removable pick-up plate and a depositing belt which is attached to the stirrup, and the apparatus is again ready to operate.

A further embodiment consists in replacing the support roll 6 by a shaft 20 and two discs 21 fitted opposite the sprockets 7 and integral therewith (see FIG. 5). A flat 22 formed at an appropriate place on each of the discs enables the hinged stirrup 10 to be displaced in such a way that the belt 11 passes very close to the grid of the coating device 2 and moves in a precise manner onto the guide plate 12 which, in this case, is advanced towards the tailing device 4 and is extended in the form of an arm.

In another form of the apparatus of the invention, the hinged stirrup 10 is replaced by two links 23, secured to the chains 8, and a shaft 24 on which is mounted one of the ends of the depositing belt 11, this shaft being secured to the two special links 23. These links enable the point at which the belt 11 passes through to be moved away from the circumference around which the chains 8 are looped, as illustrated in FIG. 7. Thus, as in the case of the preceding embodiment, the gap between the plate guide 12 and the tailing device 4 is reduced to a minimum.

The coating apparatus of the invention can thus be used in a particularly simple and convenient manner. Furthermore, it is relatively inexpensive and occupies little space. Consequently, it can be used in many ways in all those cases where it is not required to produce coated articles in large quantities.

The embodiment illustrated in FIGS. 8 to 10 is similar to that illustrated in FIG. 6 and in particular comprises the same system for securing the leading end of the depositing belt 11. This fixing system comprises the shaft 24 which is secured to the two special links 23 attached to the drive chains 8.

According to an important feature of the present invention, the guide plate 12 is mounted to pivot about a fixed shaft 25 with the aid of two side plates 26. This pivoting plate is held in its normal working position, shown in FIG. 9, by a return spring 27. Said plate is then caused to bear, by way of a nose 28, against an adjustable stop, which is here constituted by a screw 29 mounted in a fixed support 30, and said plate is thus located at a distance l from the tailing device 4.

Furthermore, control means are provided for temporarily moving the plate 12 away from the tailing device 4 at the moment when the leading end of the depositing belt 11 passes through. In this arrangement these control means are constituted by two cams 31 which are secured to the drive chains 8 and are adapted to cooperate with fixed counter-cams 32.

As can be seen very clearly from FIG. 10, when the cams 31 reach the counter-cams 32, they bear directly on the upper surface of the plate 12, and this causes the plate to rock about the shaft 25. The plate 12 is then separated from the tailing device 4 by a distance L which is ample for permitting the leading end of the depositing belt 11 to pass through quite safely. It will also be seen that the cams 31, secured to the drive chains 8, enable perfect synchronization to be achieved between the withdrawal movement of the guide plate and the passage of the depositing belt.

When the cams 31 move clear of the counter-cams 32, the guide plate 12 automatically returns to the normal working position illustrated in FIG. 9 under the action of the return spring 27. The distance l which separates it from the tailing device 4 is then at its minimum and may also be precisely adjusted by means of the screw 29 in dependence upon the nature of the products to be coated. In practice this distance $l$ can be as small as required since it suffices that it be slightly greater than the thickness of the belt 11.

Figure 12:
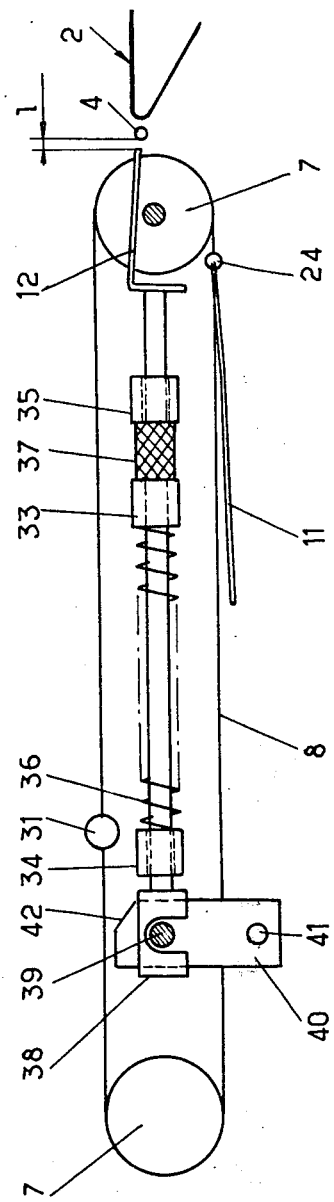
FIGS. 12 and 13 are diagrammatic views illustrating the mode of operation of this modified form.
Figure 13:
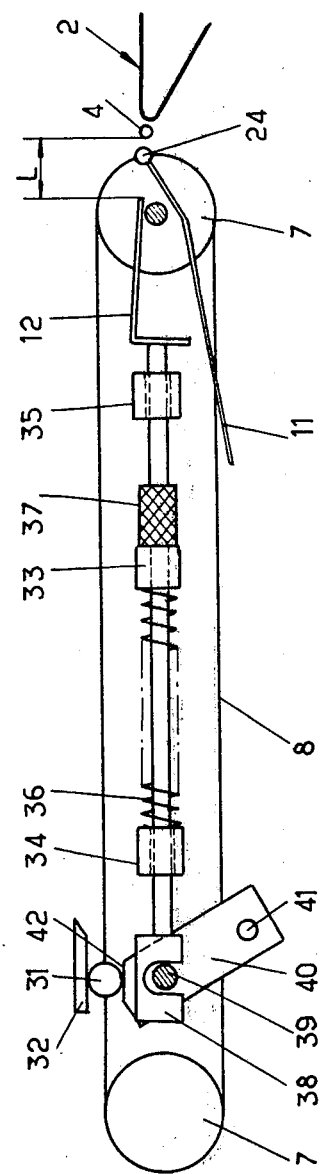

In the modified arrangement illustrated in FIGS. 11 to 13, the guide plate 12 is secured to a slide 33 adapted to move longitudinally in a fixed frame here constituted by two cross members 34 and 35. As in the preceding arrangement, there is provided a return spring 36 backed by the cross member 34 for holding the plate 12 in the normal working position illustrated in FIG. 12 so that it bears against an adjustable stop here constituted by a knurled nut 37 co-operating with the cross member 35.

The slide 33 is longitudinally displaced by means of a control head 38 engaging a bar 39 which is supported by two bearing members 40 pivotable about fixed shafts 41. As previously, the displacement control proper is achieved by means of cams 31 secured to the drive chains 8 and co-operating with fixed counter-cams 32.

As can be very clearly seen from FIG. 13, when the cams 31 reach the counter-cams 32 they are applied to the bevelled surfaces 42 formed on the bearing members 40. The latter pivot about their shafts 41 and impart forward movement to the slide 33 and the plate 12 which is integral therewith and which therefore moves through a distance L away from the tailing device 4 so as to afford free passage to the leading end of the depositing belt 11.

When the bearing members 40 pivot, the bevelled surfaces 42 move downwards and finally clear of the cams 31, this causing the slide to return to its original position under the action of the return spring 36. The guide plate 12 is then situated at a minimum distance $l$ from the tailing device 4, which distance is set by adjusting the knurled nut 37.

What I claim:

1. Apparatus for coating confectionery such as chocolates or biscuits, comprising:

a feed device for receiving the confectionery to be coated and feeding the confectionery to a coating device wherein the confectionery is coated, means for driving the feed device and the coating device in synchronism, and means disposed immediately downstream of the coating device for receiving and discharging the coated confectionery and including a removable belt and drive chain for engaging and advancing the belt over a guide plate fitted adjacent the coating device and thence over a removable support plate whereby confectionery coated in the coating device is received on the advancing belt, said guide plate having a normal working position and being secured to a longitudinally slidable means, mounted within a fixed frame and including pivotable support means, so as to be displaceable away from the coating device out of said working position, and control means for temporarily displacing the guide plate away from the coating device during the passage of the leading end of the belt into a gap defined between the leading edge of the guide plate and the coating device, said control means including a cam, mounted upon said chain for driving said belt, which operatively engages said pivotable support means of said slidable guide plate means.

2. Apparatus according to any one of claim 1, including a return spring for automatically returning the guide plate to the working position after passage of the leading end of the belt through the gap, and adjustable stop means for setting the working position of the guide plate.

* * * * *